(12) United States Patent
Kalsi

(10) Patent No.: US 7,453,174 B1
(45) Date of Patent: Nov. 18, 2008

(54) SUPERCONDUCTING ELECTRIC MOTOR

(75) Inventor: Swarn S. Kalsi, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 09/371,692

(22) Filed: Aug. 10, 1999

(51) Int. Cl.
*H02K 9/00* (2006.01)
*H02K 3/46* (2006.01)

(52) U.S. Cl. .................. 310/52; 310/10; 310/216; 310/261

(58) Field of Classification Search .............. 310/10, 310/52, 54, 216–218, 261, 269; 505/166
See application file for complete search history.

(56) References Cited

U.S. PATENT DOCUMENTS

| | | | |
|---|---|---|---|
| 3,904,901 A * | 9/1975 | Renard et al. ............... 310/52 |
| 3,916,229 A * | 10/1975 | Litz et al. ................... 310/52 |
| 3,991,333 A * | 11/1976 | Laskaris .................... 310/52 |
| 4,058,746 A * | 11/1977 | Mole et al. ................. 310/10 |
| 4,176,291 A * | 11/1979 | Rabinowitz ................ 310/52 |
| 4,532,458 A | 7/1985 | Kuznetsov et al. ......... 318/111 |
| 4,885,494 A * | 12/1989 | Higashi .................... 505/166 |
| 5,325,002 A * | 6/1994 | Rabinowitz et al. ........ 505/166 |
| 5,602,430 A * | 2/1997 | Kalsi et al. ................. 310/12 |
| 5,777,420 A * | 7/1998 | Gamble et al. ............. 310/261 |
| 5,994,814 A * | 11/1999 | Kawabata et al. ......... 310/216 |

FOREIGN PATENT DOCUMENTS

| EP | 0690550 | 1/1996 |
|---|---|---|
| GB | 2126028 | 3/1984 |

* cited by examiner

*Primary Examiner*—Burton Mullins
(74) *Attorney, Agent, or Firm*—Occhiuti Rohlicek & Tsao LLP

(57) ABSTRACT

A superconducting motor which operates in a synchronous mode of operation, can also be operated in an induction mode in the event that the superconducting components of the motor lose their superconducting properties (e.g., due to cooling system failure). The superconducting electric motor includes a rotor assembly having at least one superconducting winding which, in operation, generates a flux path within the rotor assembly, and a support member which supports the at least one superconducting winding. The rotor assembly is configured to operate in a synchronous mode of operation at temperatures in which the superconducting winding exhibits superconducting characteristics and in a steady-state induction mode of operation at temperatures in which the superconducting winding exhibits non-superconducting characteristics.

21 Claims, 3 Drawing Sheets

SUPERCONDUCTING ELECTRIC MOTOR

BACKGROUND OF THE INVENTION

The invention relates to the construction and operation of superconducting electric machines, including superconducting electric motors.

There are a wide variety of electric motors, including linear and rotary motors. Among the more popular rotary electric motors are AC induction and AC synchronous motors. With both motors, the manner in which the motor rotates involves the interaction of magnetic fields of the rotor and the stator.

For the AC induction motor, the stator windings are usually connected to a supply in one or three phase form. By applying a voltage across the winding, a radial rotating magnetic field is formed. The rotor has layers of conductive strands along its periphery. The strands are generally short-circuited to form conductive closed loops. The rotating magnetic fields produced by the stator induce a current into the conductive loops of the rotor. Once that occurs, the magnetic field causes forces to act on the current carrying conductors, which results in a torque on the rotor.

The advantage and simplicity of the AC induction motor is that the currents in the rotor do not have to be supplied by commutator, like they do in a DC motor. The velocity of the rotating magnetic field of the stator can be calculated with the formula below:

$$V=\pi rf/p$$

where:

p is the number of poles;

r is the radius of the air gap; and f is the frequency.

The rotor reacts to the magnetic field, but does not travel at the same speed. The speed of the rotor actually lags behind the speed of the magnetic field. The term "slip" is generally used to quantify the slower speed of the rotor relative to the magnetic field. The rotor is not locked into any position and, therefore, will continue to slip throughout the motion. The amount of slip increases proportionally with increases in load. More recently, induction motors are being controlled by AC variable speed drives (inverters). These drives control the frequency of the AC supply fed to the windings, making the induction motor a growing competitor in the controlled velocity market, where the DC motor previously dominated. However, one needs to insure that the motor is inverter rated before coupling the two together. The problem of slip will still exist, unless velocity feedback is provided.

AC synchronous motors have a stator very similar to that of the AC induction motor. An AC synchronous motor stator includes slots along its periphery within which windings are placed. The quantity of windings and slots is determined in part by the number of phases (usually 3 or 1) and the number of poles (usually 2 or 4). The stator produces a rotating magnetic field that is proportional to the frequency supplied. As was the case with the AC induction motor, the speed of the rotating magnetic field in an AC synchronous motor, is calculated with the formula $V=\pi rf/p$.

The main difference between the synchronous motor and the induction motor is that the rotor of this motor travels at the same speed as the rotating magnetic field. This is possible because the magnetic field of the rotor is no longer induced. The rotor either has permanent magnets or dc excited currents, which are forced to lock into a certain position when confronted with another magnetic field. Thus, the problem with slip and speed variation with varying loads is eliminated.

Recently, efforts have been ongoing in applying cryogenic technology to electric machines, including both induction and synchronous electric motors. The use of superconducting windings in these machines has resulted in a significant increase in the field magnetomotive forces generated by the windings and increased flux and power densities of the machines.

SUMMARY OF THE INVENTION

The invention features a superconducting motor which operates in a synchronous mode of operation, but can also be operated in an induction mode in the event that the superconducting components of the motor lose their superconducting properties (e.g., due to cooling system or other hardware failure).

In one aspect of the invention, the superconducting electric motor includes a rotor assembly having at least one superconducting winding which, in operation, generates a flux path within the rotor assembly, and a support member which supports the at least one superconducting winding. The rotor assembly is configured to operate in a synchronous mode of operation at temperatures when the superconducting winding exhibits superconducting characteristics and in a steady-state induction mode of operation at temperatures when the superconducting winding exhibits non-superconducting characteristics.

A superconducting motor configured in this manner has numerous advantages including allowing continued operation—albeit at reduced power—of the motor. For example, the superconducting motors can be advantageously used as part of a ship propulsion system. In this application, if the cooling system used to cool the superconducting windings were to fail, the motor could be operated in the induction mode, allowing the ship to continue to travel at some fraction of its rated speed. When the cooling system problem is remedied, the superconducting motor is simply returned to its normal, full power, synchronous mode of operation.

Embodiments of this aspect of the invention may include one or more of the following features.

The rotor assembly includes induction structure for carrying current at levels sufficient to allow the steady-state induction mode of operation. Because induced currents are generated in the rotor assembly in the induction mode, structure for supporting these currents are necessary. The induction structure is configured to allow the superconducting motor to generate a starting torque which is at least 50% of the rated torque in the induction mode of operation. Further, the induction structure is configured to allow the superconducting motor to generate a peak torque (breakdown torque) which is at least twice the rated torque in the induction mode of operation.

In one embodiment, at least a portion of the induction structure is spaced from the at least one superconducting winding by a thermal isolation vacuum region. That is, a portion of the induction structure is in the warm region of the rotor assembly, such as an electromagnetic shield member. The induction structure can also include a cryostat positioned between the thermal isolation vacuum region and the electromagnetic shield member. Thus, the cryostat not only serves to cool the superconducting windings of the rotor assembly, but also serves to support induced currents when the motor operates in the induction mode.

The electromagnetic shield member includes a conductive, non-magnetic material (e.g., copper, aluminum). The support member includes laminations, each lamination lying in a plane parallel to magnetic field flux lines extending through the laminations during operation of the superconducting electric motor. The cold support member which supports the at least one superconducting winding can also serve as part of the induction structure. In preferred embodiments, the cold support member should be formed as a series of laminations to avoid electrical heating in the cold environment of the motor.

The superconducting electric motor also includes a stator assembly electromagnetically coupled to the rotor assembly, and an adjustable speed drive for providing an electrical signal to the stator assembly. The adjustable speed drive provides a signal at a first frequency to the stator to start the superconducting motor in the synchronous mode of operation and provides a signal at a second frequency, less than the first frequency, to the stator in the steady-state induction mode of operation.

The superconducting winding includes a high temperature superconductor (HTS) and may be formed in the shape of a racetrack. The support member is formed of a non-magnetic material (e.g., aluminum).

In another aspect of the invention, a method of operating a superconducting electric motor of the type described above includes the following steps. The temperature of the superconducting winding is monitored (e.g., with a sensor). The superconducting motor is operated in a synchronous mode at a temperature wherein the superconducting winding exhibits superconducting characteristics. However, at a temperature wherein the superconducting winding exhibits non-superconducting characteristics, the superconducting motor is operated in a steady-state induction mode.

In one embodiment of this aspect of the invention, when operating the superconducting motor in the synchronous mode, an electrical signal having a first frequency is provided to a stator assembly, which is electromagnetically coupled to the rotor assembly. When operating the superconducting motor in the steady-state induction mode, a signal at a second frequency, less than the first frequency is provided to the stator assembly.

Other advantages and features of the invention will become apparent from the following description and the claims.

DETAILED DESCRIPTION

Figure 1:
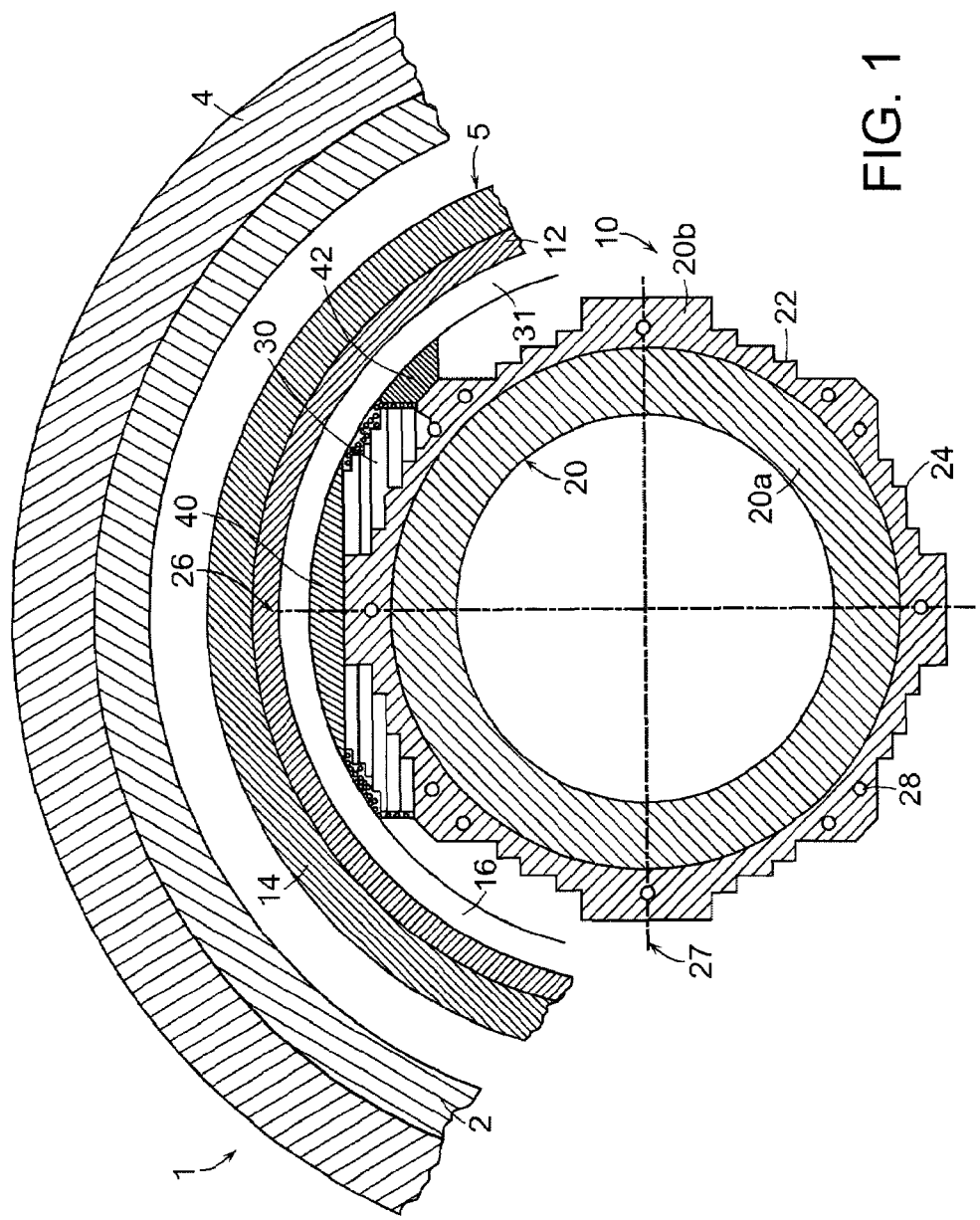
FIG. 1 is a cross-sectional end view of a portion of a superconducting synchronous motor in accordance with the invention.

Referring to FIG. 1, a superconducting synchronous motor 1 includes a rotor assembly 5 having a four-pole topology surrounded by a cryostat 12 and an outer electromagnetic shield 14, both of which are radially spaced from a cold rotor section 10 of assembly 5 by a vacuum layer 16. Electromagnetic shield 14 is, in turn, surrounded by a three-phase stator winding 2 and a laminated flux shield 4, here formed of iron. In other embodiments, iron flux shield 4 could be replaced with a solid metallic shield made of a non-magnetic material (e.g., copper or aluminum). Electromagnetic shield 14 is fabricated from a preferably non-magnetic material (e.g., copper, aluminum, steel, etc.). Rotor cold section 10 also includes a cold support member 20 fabricated from a high-strength and ductile material (e.g., aluminum). As will be discussed in greater detail below, aside from their typical functions, cryostat 12, electromagnetic shield 14, and cold support member 20, in aggregate, serve an additional purpose when synchronous motor 1 no longer operates in a superconducting state (e.g., due to cooling failure).

Figure 2:
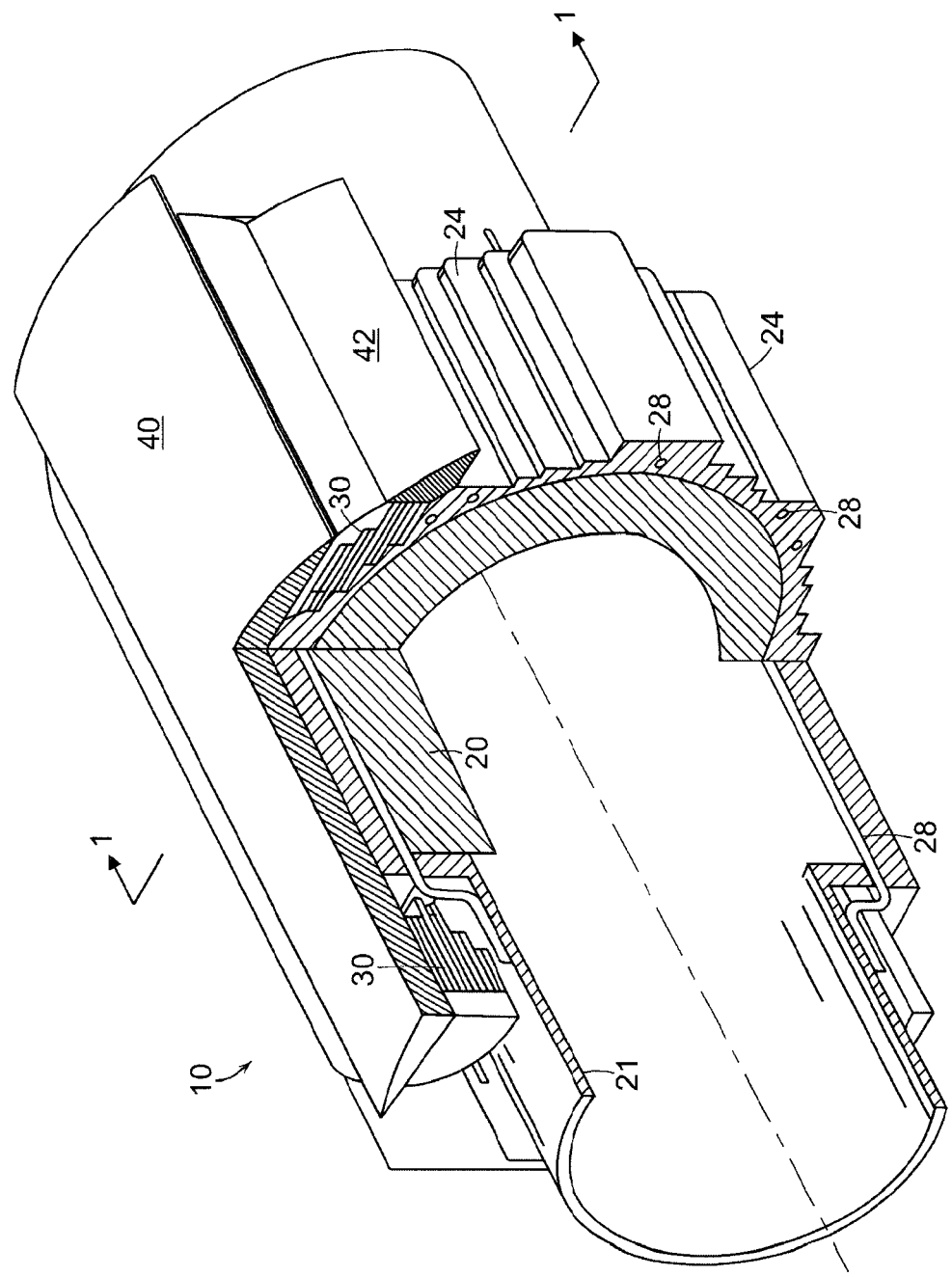
FIG. 2 is an isometric, partially cut-away view of a cold rotor section of a rotor assembly for the superconducting synchronous machine of FIG. 1.

Referring to FIGS. 1 and 2, in this embodiment, cold support member 20 is shown as an inner cylindrical member 20a surrounded by an outer cylindrical member 20b having an outer surface 22 with four stepped profiles 24. However, in alternative embodiments, cold support member 20 is a single integral unit.

Each stepped profile 24 supports one of four superconducting winding assemblies 30 (only one shown here,) each winding assembly associated with a pole of the motor. In particular, each of a first diametrically opposing pair of the superconducting winding assemblies is wound about a first axis 26. Each of a second diametrically opposing pair of the winding assembly is wound about a second axis 27, transverse to axis 26. The winding assemblies are electrically connected together and are supported along the outer periphery of the support member at the stepped profiles 24 formed along axes 26, 27.

As shown most clearly in FIG. 2, in this embodiment, winding assemblies 30 extend beyond the end of cold support member 20. At these end regions, winding assemblies 30 are spaced from cold support member 20 by a vacuum layer 31 (FIG. 1) which is generally filled with multi-layered insulation (e.g., layers of aluminized mylar). This arrangement ensures that the winding assemblies are maintained at their cryogenic temperature while allowing the length of the rotor assembly and motor to be decreased.

Cold support member 20 includes end extension members 21 which define warm/cold transition regions between the ambient environment and the cryogenically cooled portion of the rotor assembly. Cold support member 20 also includes a number of cooling ducts 28 which extend through the length of the cold support member and carry liquid or gas refrigerants needed for cooling the superconducting winding assemblies. Winding assemblies 30 are secured to cold support member 20 by pole caps 40 attached at the four polar positions of the rotor and with quadrature caps 42 equally spaced and offset 45⁰ from axes 26, 27 between each pole cap. The pole and quadrature caps 40, 42 are generally fabricated from the same material as cold support member 20 and, together with the cold support member, form a complete cylinder.

Figure 3:
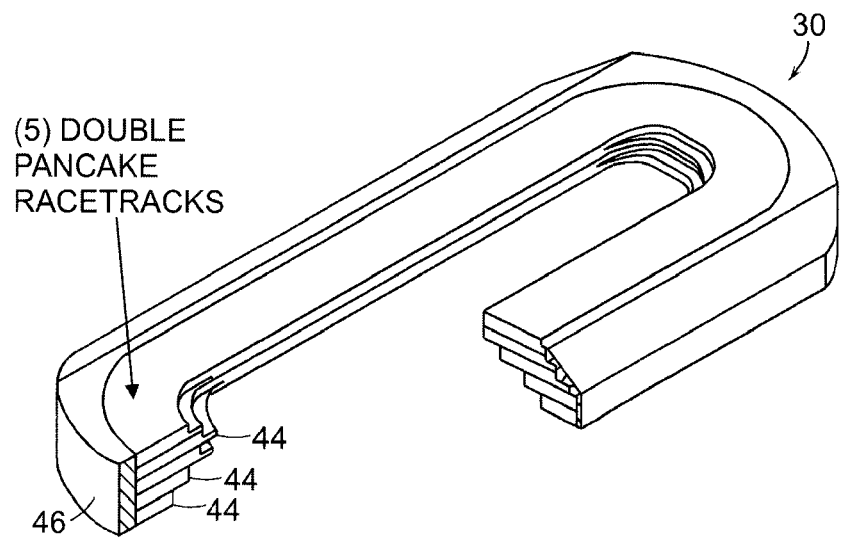
FIG. 3 is an isometric, partially cut away view of a racetrack superconducting winding for use with the superconducting synchronous machine of FIG. 1.

Referring to FIG. 3, each superconducting winding assembly 30 is associated with each pole of the motor and includes racetrack double "pancake" coils 44 positioned within a coil support shell 46. Each double pancake coil has co-wound conductors wound in parallel which are then stacked coaxially on top of each other. In this embodiment, the conductor can be a high temperature copper oxide ceramic superconducting material, such as $Bi_2Sr_2Ca_2Cu_3O_x$, commonly designated BSCCO 2223. Other high temperature superconductors including YBCO (or superconductors where a rare earth element is substituted for the yttrium), TBCCO (i.e., thallium-barium-calcium-copper-oxide family), and HgBCCO (i.e., mercury-barium-calcium-copper-oxide family) are also within the scope of the invention. As shown here, one or more of the double pancake coils 44 may include a pancake coil having a diameter smaller than its associated pancake coil of the double pancake, the two coils of a pair being wound from the same continuous length of superconducting tape. An approach for forming a coil in this manner is described in U.S. Pat. No. 5,581,220, which is assigned to the assignee of the present invention and incorporated herein by reference. Preferred embodiments are based on the magnetic and thermal properties of high temperature superconducting composites, preferably including superconducting ceramic oxides and most preferably those of the copper oxide family.

In operation, superconducting motor 1 is operated in the synchronous mode so that rotor assembly 5 rotates at the same speed as the rotating magnetic field produced by the surrounding stator winding (FIG. 1). In essence, the DC excited fields generated by superconducting windings 30 are locked in synchronous fashion with the stator magnetic field. In this mode, magnetic field interaction is limited to the stator field and the superconducting winding assemblies with virtually no currents induced in the surrounding structure of the rotor assembly. Except for the short period at startup, the synchronous motor operates at a constant speed, thus the problems of slip and speed variation are eliminated.

However, if superconducting rotor assembly 5 experiences a cooling failure, winding assemblies 30 would lose their superconducting properties. In this case, superconducting rotor assembly 5 is operated in the induction mode. In the induction mode, rotor assembly 5 rotates at a speed less than the synchronous speed of the stator field. The relative change between the rotor speed and the stator field generates currents in the surrounding structure of the cryostat 12, electromagnetic shield 14, and cold support member 20. These currents interact with the stator field to produce shaft torque. Thus, cryostat 12, electromagnetic shield 14, and cold support member 20 must be formed of a material having sufficient mass to generate sufficient torque to drive the motor in the induction mode. By sufficient torque, it is meant that motor 1 is capable of generating, in the induction mode, a starting torque that is at least 50% of the rated torque. Further, the peak torque should be at least twice the rated torque. If there is insufficient material for the currents to flow, tremendous heat will be generated causing failure of the motor. These currents produce sufficient torque to allow continued operation of the motor, albeit at a lower power. Providing even 30% of the rated torque is generally acceptable for many applications.

To allow continuous, steady state operation in the induction mode (e.g., until the cooling failure is addressed), it is important not to exceed the rated value of stator current. One approach for ensuring that the rated value is not exceeded is to operate the motor at a lower rated terminal voltage (e.g., 50% of rated voltage). In this condition, the motor would produce approximately 30% of the rated torque. Another approach for achieving the same result is to supply the stator winding with a current at 30% of the rated frequency at the reduced terminal voltage. For example, the current signal provided to the stator winding would be reduced from 60 Hz to 18 Hz. In this condition, the motor will generate 10% of the rated torque at about 30% of its rated speed. Desired torque-speed characteristics can be optimized by suitable design of cryostat 12 and electromagnetic shield 14.

In one embodiment, an adjustable speed drive (ASD) is used in the induction mode to lower the frequency of the signal provided to the stator winding. Advantageously, the same ASD can be used during startup in the synchronous mode.

Figure 4:
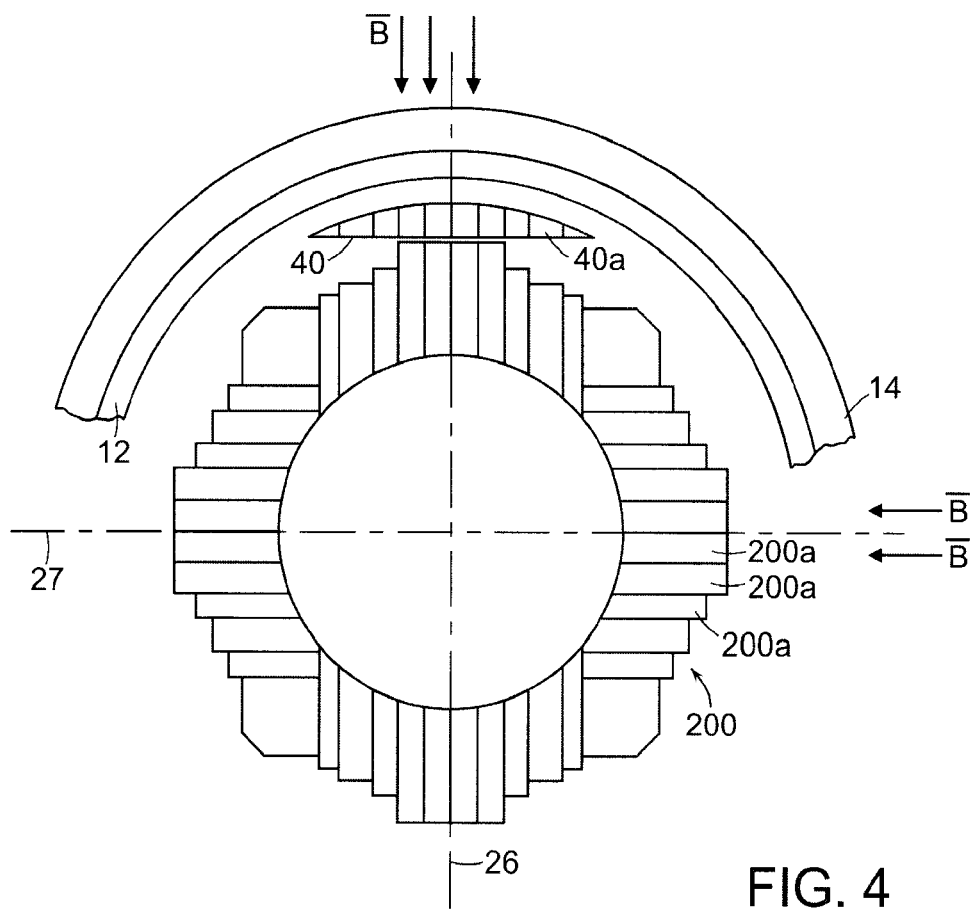
FIG. 4 is a cross-sectional end view of the rotor assembly of FIG. 1.

Although the cold support member might be formed as solid integral members, stacked sets of laminations are preferable. Referring to FIG. 4, for example, a cold support member 200 is formed as a series of stacked laminations 200a. Pole cap 40a is also shown to be segmented into a series of adjacent laminations. Forming the cold support member with laminations serves to reduce eddy current heating in theses cold components. Each lamination is oriented to be parallel to the direction of the stator magnetic field (B field). In the synchronous mode of operation, segmentation of these components has little effect because there is virtually no current induced in the components. However, in the induction mode, the induced currents flowing through cryostat 12, electromagnetic shield 14, and cold support member 200 generate tremendous heating due to eddy current losses. The greater the heat load, the larger the size and cost of the cooling system required to remove the heat. The currents induced in cryostat 12 and electromagnetic shield 14 are used to produce torque. The eddy current losses in the cold support member are significantly reduced by segmenting the components such that each lamination lies in a plane parallel to the magnetic field flux lines extending through the laminations.

In certain embodiments, in order to increase the ductile strength of the laminated structure in the radial direction, reinforcing layers (e.g., fiberglass) may be placed between the laminations. The laminations and reinforcing layers can then be impregnated with, for example, epoxy.

Other embodiments are within the scope of the claims. For example, although a racetrack double pancake configuration was described above in conjunction with FIGS. 1-4, other forms of superconducting windings are equally applicable to the invention. For example, tapered superconducting coils, such as those described in co-pending application Ser. No. 09/359,497, entitled "Superconducting Magnetic Coil", filed on Jul. 23, 1999, may also be used. This application, assigned to the assignee of the present invention, and incorporated herein by reference, describes tapered superconducting coils that advantageously conform to the outer surface of cylindrical structures. Thus, in this application, the stepped profiles of cold support members 20 and 120 could be eliminated.

In still other embodiments, additional cooling can be provided to the electromagnetic shield, for example with forced air, forced water, or sprayed water.

What is claimed is:

1. A superconducting electric motor comprising:
    a rotor assembly including:
        a plurality of superconducting windings that, in operation, each generate a flux path within the rotor assembly,
        a laminated support member that supports the superconducting windings, and
        an induction structure to support induction current for driving the motor in a steady-state induction mode;
    the laminated support member including laminations, a first set of laminations oriented in a first orientation and a second set of laminations oriented in a second orientation different than the first orientation;
    the rotor assembly being configured to operate
        in a synchronous mode at temperatures in which the superconducting windings exhibit superconducting characteristics, and
        in a steady-state induction mode at temperatures in which the superconducting windings exhibit non-superconducting characteristics.

2. The superconducting electric motor of claim 1, wherein the induction structure is configured to allow the superconducting motor to generate a starting torque that is at least 50% of the rated torque in the steady-state induction mode.

3. The superconducting electric motor of claim 2, wherein the induction structure is configured to allow the superconducting motor to generate a peak torque that is approximately twice the rated torque in the steady-state induction mode.

4. The superconducting electric motor of claim 3, wherein a portion of the induction structure is spaced from the superconducting winding by a thermal isolation vacuum region.

5. The superconducting electric motor of claim 4, wherein said portion of the induction structure spaced from the superconducting winding by a thermal isolation vacuum region includes an electromagnetic shield member.

6. The superconducting electric motor of claim 5, further comprising a cryostat positioned between the thermal isolation vacuum region and the induction structure.

7. The superconducting electric motor of claim 5, wherein said electromagnetic shield member includes a conductive, non-magnetic material.

8. The superconducting electric motor of claim 3, wherein the induction structure includes the laminated support member.

9. The superconducting electric motor of claim 8, wherein the induction structure further includes an electromagnetic shield spaced from the superconducting winding by a thermal isolation vacuum region.

10. The superconducting electric motor of claim 9, wherein the laminated support member includes laminations lying in a plane parallel to magnetic field flux lines extending through the laminations during operation of the superconducting electric motor.

11. The superconducting electric motor of claim 1, further comprising:
a stator assembly electromagnetically coupled to the rotor assembly; and
an adjustable speed drive that provides an electrical signal to the stator assembly.

12. The superconducting electric motor of claim 11, wherein the adjustable speed drive provides the stator assembly with a signal at a first frequency to start the superconducting motor in the synchronous mode and provides the stator assembly with a signal at a second frequency to operate the motor in the steady-state induction mode, the second frequency being less than the first frequency.

13. The superconducting electric motor of claim 1, wherein the superconducting winding includes a high temperature superconductor.

14. The superconducting electric motor of claim 1, wherein the superconducting winding comprises a racetrack-shaped winding.

15. The superconducting electric motor of claim 1, wherein the support member comprises aluminum.

16. A superconducting electric motor comprising:
a rotor assembly including a plurality of superconducting windings each having a high-temperature superconductor, the superconducting windings, in operation, generating flux within the rotor assembly, the rotor assembly configured to operate
in a synchronous mode at temperatures in which the superconducting windings exhibit superconducting characteristics, and
in a steady-state induction mode at temperatures in which the superconducting windings exhibit non-superconducting characteristics;
a cryostat surrounding the rotor assembly to maintain the superconducting windings at cryogenic temperatures; and
induction structure that, during operation, carries current at levels sufficient to allow the motor to operate in the steady-state induction mode, the induction structure including:
a laminated support member that supports the superconducting windings; and
an electromagnetic shield surrounding the cryostat and the superconducting windings,
the laminated support member including laminations, a first set of laminations oriented in a first orientation and a second set of laminations oriented in a second orientation different than the first orientation.

17. The superconducting electric motor of claim 16, further comprising:
a stator assembly electromagnetically coupled to the rotor assembly; and
an adjustable speed drive that provides an electrical signal to the stator assembly.

18. The superconducting electric motor of claim 17, wherein the adjustable speed drive provides the stator assembly with a signal at a first frequency to start the superconducting motor in the synchronous mode, and provides the stator assembly with a signal at a second frequency to operate the motor in the steady-state induction mode, the second frequency being less than the first frequency.

19. The superconducting electric motor of claim 16, wherein the laminated support member includes laminations lying in a plane parallel to magnetic field flux lines extending through the laminations during operation of the superconducting electric motor.

20. A method of operating the superconducting electric motor of claim 1, the method comprising:
monitoring the temperature of the superconducting winding;
operating the superconducting motor in a synchronous mode at temperatures in which the superconducting winding exhibits superconducting characteristics; and
operating the superconducting motor in a steady-state induction mode at temperatures in which the superconducting winding exhibits non-superconducting characteristics.

21. The method of claim 20,
wherein operating the superconducting motor in the synchronous mode includes providing an electrical signal to a stator assembly electromagnetically coupled to the rotor assembly, the signal having a first frequency; and
wherein operating the superconducting motor in the steady-state induction mode includes providing a signal to the stator assembly at a second frequency, the second frequency being less than the first frequency.

* * * * *